United States Patent
Ji et al.

(10) Patent No.: US 9,892,312 B1
(45) Date of Patent: Feb. 13, 2018

(54) FACE DETECTING AND TRACKING METHOD AND DEVICE AND METHOD AND SYSTEM FOR CONTROLLING ROTATION OF ROBOT HEAD

(71) Applicant: UBTECH Robotics Corp., Shenzhen (CN)

(72) Inventors: Yuan Ji, Shenzhen (CN); Youjun Xiong, Shenzhen (CN)

(73) Assignee: UBTECH ROBOTICS CORP., Shenzhen (CN)

( * ) Notice: Subject to any disclaimer, the term of this patent is extended or adjusted under 35 U.S.C. 154(b) by 0 days.

(21) Appl. No.: 15/348,641

(22) Filed: Nov. 10, 2016

(30) Foreign Application Priority Data

Jul. 29, 2016 (CN) .......................... 2016 1 0619340

(51) Int. Cl.
  *G06K 9/00* (2006.01)
  *G06T 7/00* (2017.01)
  *B25J 9/00* (2006.01)

(52) U.S. Cl.
  CPC ........ *G06K 9/00228* (2013.01); *B25J 9/0003* (2013.01); *G06K 9/00268* (2013.01); *G06T 7/0051* (2013.01)

(58) Field of Classification Search
  CPC ... G06T 7/215; G06T 7/0051; G06K 9/00228; G06K 9/00288; G06K 9/00221; G06K 9/00268
  See application file for complete search history.

(56) References Cited

U.S. PATENT DOCUMENTS

| | | | |
|---|---|---|---|
| 9,792,491 B1* | 10/2017 | Ramaswamy | G06K 9/00362 |
| 2012/0219180 A1* | 8/2012 | Mehra | G06F 3/013 382/103 |
| 2015/0077323 A1* | 3/2015 | Ramaswamy | G06F 3/012 345/156 |
| 2015/0086108 A1* | 3/2015 | Craig | G06F 21/32 382/154 |
| 2015/0302239 A1* | 10/2015 | Ohba | G06K 9/00261 382/154 |

* cited by examiner

*Primary Examiner* — Stephen R Koziol
*Assistant Examiner* — Shaghayegh Azima

(57) ABSTRACT

A face detecting and tracking method includes: acquiring an image and performing a depth detection for the image to obtain a depth value of each pixel of the image; determining one or more face candidate areas based on depth value of each pixel of the image of current frame; performing a face detection to the one or more face candidate areas to determine one or more face boxes of the image of current frame; and determining a tracking box of the image of current frame based on the one or more face boxes and a tracked face box, and tracking the face in the tracking box of the image of current frame.

11 Claims, 5 Drawing Sheets

FACE DETECTING AND TRACKING METHOD AND DEVICE AND METHOD AND SYSTEM FOR CONTROLLING ROTATION OF ROBOT HEAD

CROSS REFERENCE TO RELATED APPLICATIONS

This application claims priority to Chinese Patent Application No. 201610619340.1, filed Jul. 29, 2016, which is hereby incorporated by reference herein as if set forth in its entirety.

BACKGROUND

1. Technical Field

The present disclosure generally relates to human face recognition technology, and particularly to a human face detecting and tracking method and device, and a method and system for controlling rotation of a robot head.

2. Description of Related Art

As computer vision technology becomes mature, it has been widely used in daily lives. For example, it can be used to control a robot and enables the robot to have visual function, thereby performing various detecting, determining, recognizing and measuring operations. Some conventional robots are equipped with a camera and are able to detect human faces in the images captured by the camera using face detecting technology, and track a detected human face, causing head of the robots to rotate as the human face moves. Some of the conventional human face detecting and tracking methods have high detection errors, which may tend to recognize non-human faces as human faces. Because of the high detection errors, the control of the rotation process of the robot heads is not accurate when controlling the robot heads to rotate using the conventional human face detecting and tracking methods.

SUMMARY

A face detecting and tracking method includes: acquiring an image and performing a depth detection for the image to obtain a depth value of each pixel of the image; determining one or more face candidate areas based on depth value of each pixel of the image of current frame; performing a face detection to the one or more face candidate areas to determine one or more face boxes of the image of current frame; and determining a tracking box of the image of current frame based on the one or more face boxes and a tracked face box, and tracking the face in the tracking box of the image of current frame.

A method for controlling rotation of a robot head includes: determining a tracking box of a first image using the above face detecting and tracking method; determining if the tracking box of the first image is located at a central area of the first image; and if no, controlling a robot head to rotate until a tracking box of a second image captured after the first image is located at a central area of the second image. A face detecting and tracking device and a control system for controlling rotation of a robot head are also provided.

Other objects, advantages and novel features of the invention will become more apparent from the following detailed description when taken in conjunction with the accompanying drawings.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
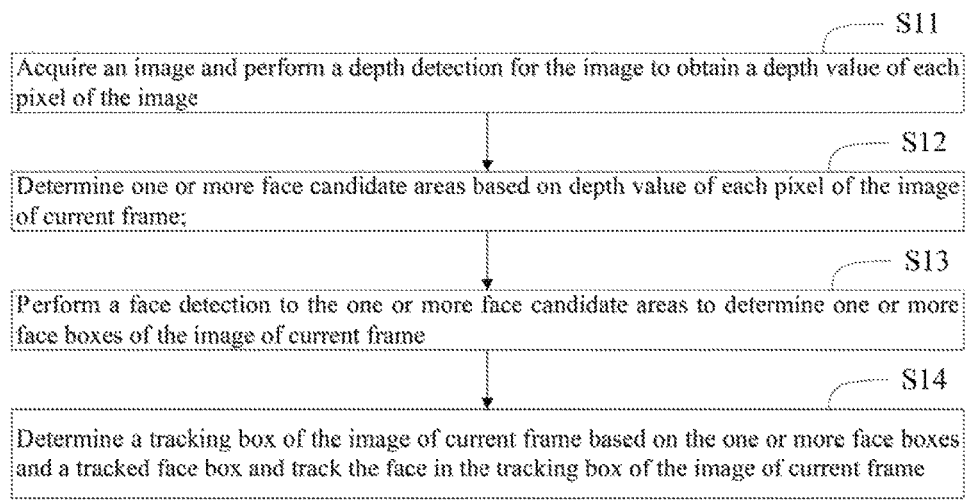
FIG. 1 is a flow chart of a face detecting and tracking method according to embodiment 1.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

Embodiment 1

Figure 2:
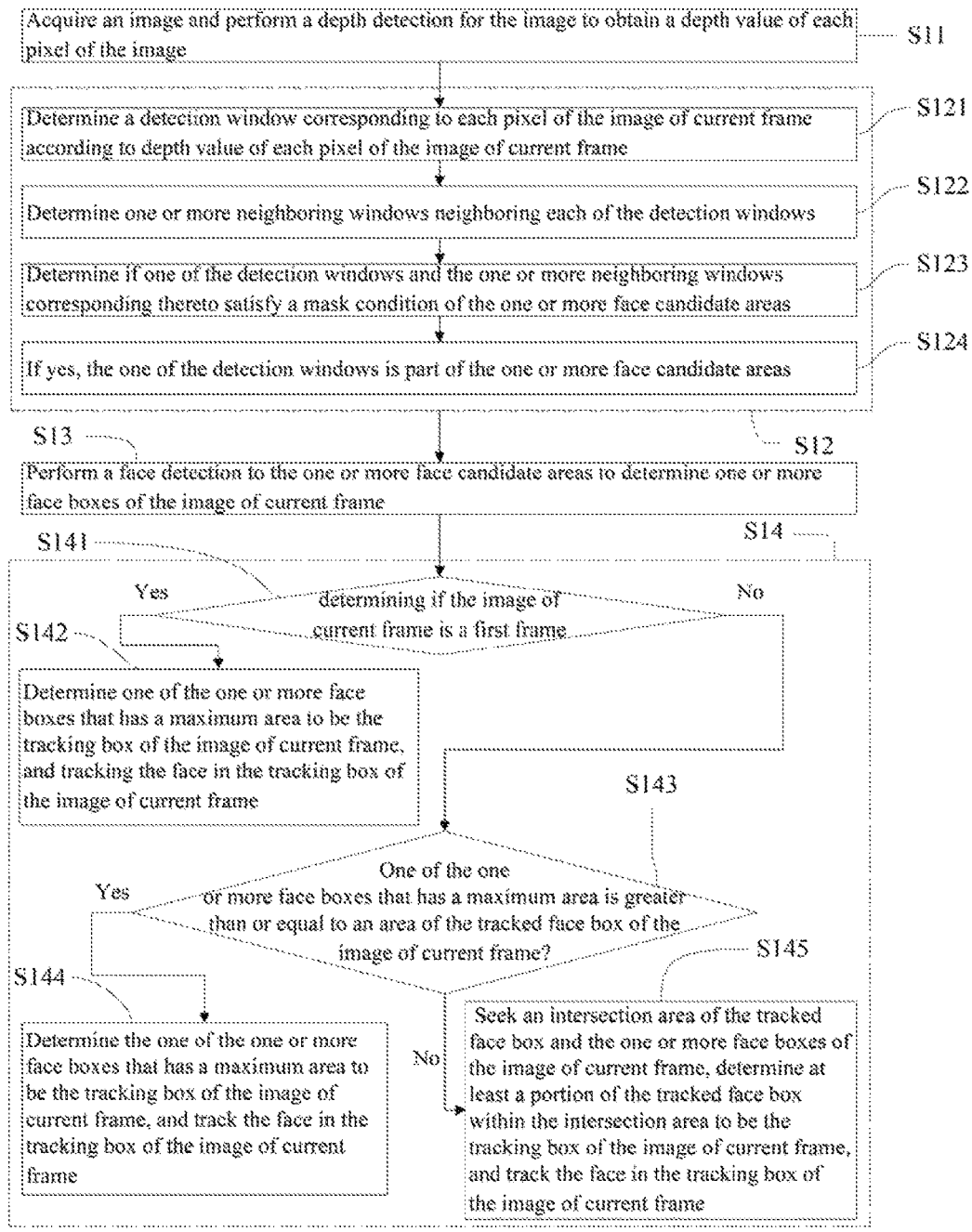
FIG. 2 is another flow chart of a face detecting and tracking method according to embodiment 1.

FIGS. 1 and 2 show flow charts of a human face detecting and tracking method according to one embodiment. As shown in FIG. 1, the method includes the following steps:

Step S11: acquiring an image and performing a depth detection for the image to obtain a depth value of each pixel of the image. In the embodiment, each image includes I×J pixels, i.e., I rows and J columns of pixels. A pixel (i, j) refers to the pixel in column i, row j of the image, and the depth value of the pixel (i, j) is represented as d (i, j). One or more depth sensors are used to perform depth detection and process to the captured images to acquire the depth value d (i, j) of each pixel (i, j).

Step S12: determining one or more face candidate areas based on depth value d (i, j) of each pixel (i, j) of the image of current frame. A face candidate area is an area that may include a human face. A human face detecting method is used to detect a human face in the face candidate area, which increases the human face detection accuracy. In the embodiment, the step S12 includes the following steps:

Step S121: determining a detection window w1 corresponding to each pixel (i, j) of the image of current frame according to depth value (i, j) of each pixel of the image of current frame. Specifically, determining a face width s (i, j) corresponding to each pixel (i, j) of the image of current frame according to depth value (i, j) of each pixel i, j) of the image of current frame. Then, creating a square detection box as the detection window w1 for each pixel (i, j) of the image of current frame. Each square detection box has a center located at a position of the pixel corresponding thereto, and a length equaling to the face width s (i, j) corresponding to the pixel that corresponds to the square detection box. The face width s (i, j) corresponding to each pixel (i, j) equals to the focal length f times an average face width $\bar{s}$, and divided by depth value (i, j) of the pixel, i.e., $$s(i, j) = \frac{f \times \bar{s}}{d(i, j)}.$$

Figure 3:
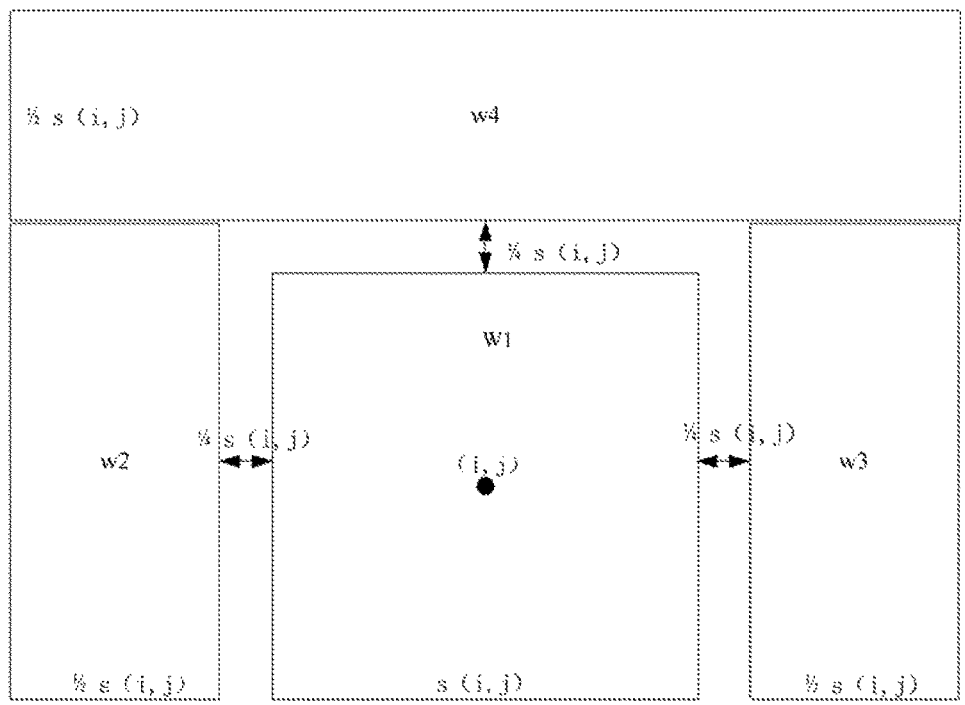
FIG. 3 is a schematic view showing a detection window and its neighboring windows.

Step S122: determining one or more neighboring windows neighboring each of the detection windows w1. The neighboring windows can include a left window w2 at the left side of the detection window w1, a right window w3 at the right side of the detection window w1, and an upper window w4 at the upper side of the detection window w1. Specifically, as shown in FIG. 3, determining a left window w2, a right window w3 and an upper window w4 that surround the detection window w1 at a left side, a right side and an upper side of the detection window w1. The detection window w1 and the left window w2, the right window w3 and the upper window w4 are spaced apart from each other by a first predetermined width. In the embodiment, the first predetermined width equals to ¼ face width s (i, j), and ¼ face width s (i, j) is thus the boundary between the face candidate area and the non-face candidate area. The left window w2 and the right window w3 are rectangles with a length of ⅝ face width s (i, j) and a width of ½ face width s (i, j). The lower sides of the left window w2 and the right window w3 are flush with the lower side of the detection window w1. The upper window w4 is a rectangle with a length of 5/2 face width s (i, j) and a width of ½ face width s (i, j). The left side of the upper window w4 is flush with the left side of the left window w2, and the right side of the upper window w4 is flush with the right side of the right window w3. In the embodiment, the length of all the sides of the detection window w1 and the neighboring windows (i.e., left window w2, right window w3 and upper window w4) are empirical values, and are related to a mask condition m (i, j) of the face candidate area.

Step S123: determining if one of the detection windows w1 and the one or more neighboring windows corresponding thereto satisfy a mask condition m (i, j) of the one or more face candidate areas. The one or more neighboring windows may include a left window w2, a right window w3 and an upper window w4. The mask condition m (i, j) includes: an absolute difference between an average depth value $\mu_{w3}(i, j)$ of the one of the detection windows w1 and the depth value d (i, j) of the pixel corresponding to the one of the detection windows w1 is less than a first threshold τ1, and an absolute difference between each of average depth values of the one or more neighboring windows, including an average depth value $\mu_{w2}(i, j)$ of the left window w2, an average depth value $\mu_{w3}(i, j)$ of the right window w3, and an average depth value $\mu_{w3}(i, j)$ of the upper window w4, and the depth value d (i, j) of the pixel corresponding to the one of the detection windows is less than a second threshold τ2. That is, if $|\mu_{w1}(i, j) - d(i, j)| < \tau 1$, $|\mu_{w2}(i, j) - d(i, j)| < \tau 2$, $|\mu_{w3}(i, j) - d(i, j)| < \tau 2$, and $|\mu_{w4}(i, j) - d(i, j)| < \tau 2$, then the mask condition m (i, j) equals to 1 and the one of the detection window w1 is one of the one or more face candidate areas. Otherwise, the mask condition m (i, j) equals to 0 and the one of the detection window w1 is not one of the one or more face candidate areas. In the embodiment, the first threshold τ1 is less than the second threshold τ2. The first threshold τ1 is 100 mm and the second threshold τ2 is 200 mm.

In the embodiment, the average depth values $\mu_{w1}(i, j)$, $\mu_{w2}(i, j)$, $\mu_{w3}(i, j)$ and $\mu_{w4}(i, j)$ can be computed using the following formula:

$$\mu_{wk} = \frac{\sum_{(i,j) \in wk} v(i, j) \cdot d(i, j)}{\sum_{(i,j) \in wk} v(i, j) + \varepsilon},$$

where ε is a constant. The d (i, j) refers to the depth value of a pixel in one of the detection windows w1, the left window w2, the right window w3 or the upper window w4. The v (i, j) refers to effective depth measurement value of a pixel in one of the detection windows w1, the left window w2, the right window w3 or the upper window w4. The v (i, j) can be 0 or 1, and the ε is not equal to 0.

Specifically, the effective depth measurement value v (i, j) of a pixel is determined as follows. First, determining if the depth value d (i, j) of a pixel is greater than zero and less than a third threshold T. If so, the effective depth measurement value v (i, j) of a pixel is 1. Otherwise, the effective depth measurement value v (i, j) of a pixel is 0. The third threshold T equals to the focal length f of a depth sensor times an average face width $\bar{s}$, and divided by a minimum face width s*. If the depth value d (i, j) of a pixel is greater than the third threshold T, the size of the detection window s (i, j) of the pixel will be less than the minimum face width s*. The detection window s (i, j) will not be recognized when the face detecting is performed. In the embodiment, the minimum face width s* is 20 pixels, and the third threshold T is 4.5 m.

Step S124: if the one of the detection windows w1 and the one or more neighboring windows corresponding thereto satisfy the mask condition m (i, j) of the one or more face candidate areas, the one of the detection windows w1 is one of the one or more face candidate areas. The depth values d (i, j) of the pixels in a detection window w1 are close to one another. The depth values d (i, j) of each pixel in a detection window w1 and the depth values d (i, j) of each pixel in its neighboring windows w2, w3 and w4 have big difference. Thus, if a detection window w1 and its neighboring windows satisfy the mask condition m (i, j) of the one or more face candidate areas, the detection window w1 is considered to be one of the one or more face candidate areas.

Step S13: performing a face detection to the one or more face candidate areas to determine one or more face boxes of the image of current frame. In the embodiment, Viola-Jones face detection algorithm is used for face detection in the one or more face candidate areas. Viola-Jones face detection algorithm extract image feature values using integral images, which increases the face detection speed to some extent. Viola-Jones face detection algorithm also uses Adaboost classifier for feature screening, and preserves the most useful features, which lowers the computation complexity during the face detection and increases the face detection speed. In addition, Viola-Jones face detection algorithm has modified the Adaboost classifier into a cascade Adaboost classifier to increase the face detection accuracy. It can be understood that other algorithms may be used to perform the face detection besides the Viola-Jones face detection algorithm.

Step S14: determining a tracking box of the image of current frame based on the one or more face boxes and a tracked face box, and tracking the face in the tracking box of the image of current frame. The tracked face box herein is a face box tracked in the image of current frame using the face detecting and tracking method. The tracking box of the image of previous frame serving as the tracked face box of the image successive to the image of previous frame, can avoid that the face detection results of several successive images are inconsistent when one of the images does not include a human face. Step S14 includes the following steps:

Step S141: determining if the image of current frame is a first frame of a plurality of images.

Step S142: if the image of current frame is the first frame of the plurality of images, then determining one of the one or more face boxes that has a maximum area to be the tracking box of the image of current frame, and tracking the face in the tracking box of the image of current frame. It can be understood that the tracked face box of the image of current frame is a face box of the image of current frame when the image of current frame is the first frame of the plurality of images. When there are plural face boxes, selecting the face box having the maximum area as the tracking box of the image of current frame and tracking the face in the tracking box of the image of current frame. The area of each face box equals to the product of the length and the width thereof.

Step S143: if the image of current frame is not the first frame of the plurality of images, then determining if one of the one or more face boxes that has a maximum area is greater than or equal to an area of the tracked face box of the image of current frame. The area of tracked face box equals to the product of the length and the width thereof.

Step S144: determining the one of the one or more thee boxes that has a maximum area to be the tracking box of the image of current frame, and tracking the face in the tracking box of the image of current frame, it the one of the one or more face boxes that has a maximum area is greater than or equal to an area of the tracked face box of the image of current frame.

Step S145: seeking an intersection area of the tracked face box and the one or more face boxes of the image of current frame, determining at least a portion of the tracked face box within the intersection area to be the tracking box of the image of current frame, and tracking the face in the tracking box of the image of current frame, if the one of the one or more face boxes that has a maximum area is less than an area of the tracked face box of the image of current frame. If no intersection area exists, determining the face box of the image of current frame having the maximum area to be the tracking box of the image of current frame, and tracking the face in the tracking box of the image of current frame. In this situation, the original tracked face box is a missing face.

Specifically, a compressive tracking algorithm is used to track the face in the tracking box of the image of current frame. The compressive tracking algorithm includes the following steps:

Acquiring a plurality of target images and background images from an image of previous frame, and performing a multi-scale transform for the plurality of target images and background images to obtain multi-scale image extraction features. Performing a dimension reduction to the multi-scale image extraction features to obtain dimension reduction features using sparse measurement matrix, and training a Naive Bayes classifier using the dimension reduction features for a screening of a target window of the image of current frame. The target images herein refer to the images acquired from inside the tracking box, and the target images are different from one another. The background images refer to the images acquired from outside the tracking box, and the background images are different from one another.

Scanning target images of a plurality of scanning windows around a target window of the image of current frame, and extracting multi-scale image extraction features of the target images, thereby avoiding scanning the whole of the image of current frame. Performing a dimension reduction to the multi-scale image extraction features to obtain dimension reduction features using the same sparse measurement matrix, and classifying the dimension reduction features using the trained Naive Bayes classifier and determining a window with the maximum classification score to be the target window of the image of next frame thereby realizing the tracking from the image of current frame to the image of next frame. It can be understood that the steps of acquiring target images of a plurality of scanning windows from around a target window of the image of current frame, extracting multi-scale image extraction features, performing a dimension reduction to the multi-scale image extraction features, and training Naive Bayes classifier to classify, realize the tracking from the image of current frame to the image of next frame, which narrows the processing range of the face tracking algorithm and increases the processing speed.

The face detecting and tracking method of the embodiment performs a depth detection, determines the depth value of each pixel of an image, determines one or more face candidate areas according to the depth value of each pixel, and performs a face detection in the one or more face candidate areas to determine one or more face boxes of the image of current frame, which reduces detection error and increases face detection accuracy. The face detecting and tracking method then determines a tracking box of the image of current frame according to the one or more face boxes of the image of current frame and tracks the face in the tracking box, to guarantee the continuity of face detection.

Embodiment 2

Figure 4:
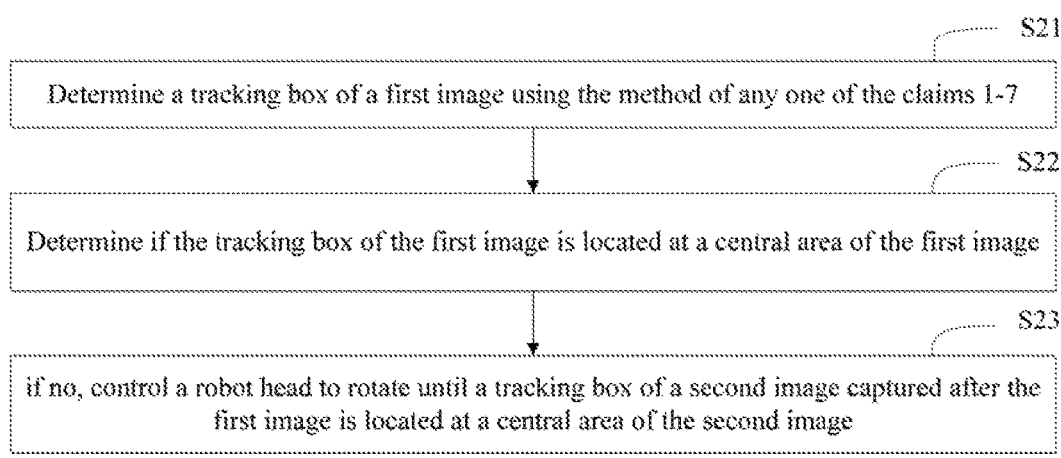
FIG. 4 is a flow chart of a method for controlling rotation of a robot head according to embodiment 2.
Figure 5:
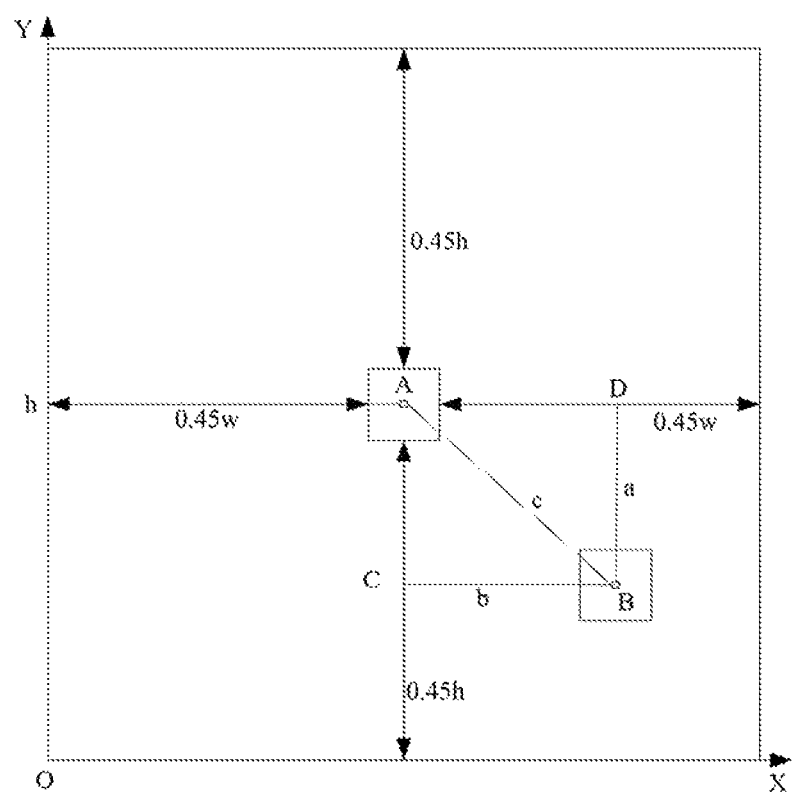
FIG. 5 is a schematic view showing a captured image of embodiment 2.

FIG. 4 shows a flow chart of a method for controlling rotation of a robot head. The robot is equipped with a camera device for capturing images, and a depth sensor and a processor for detecting depth of the captured images. The method for controlling rotation of a robot head is performed by the processor and includes the following steps:

Step S21: determining a tracking box of a first image using the method described in embodiment 1, and a center of the tracking box. As shown in FIG. 5, the coordinates (x0, y0) of the center B of the tracking box of the first image are read in real-time. It can be understood when tracking a face using the face detecting and tracking method of the embodiment 1, the steps of determining firstly one or more face candidate areas according to the depth value of each pixel, and then performing a face detection in the one or more face candidate areas, can reduce detection error and increase face detection accuracy. The face detecting and tracking method then determines a tracking box of the image according to the one or more face boxes of the image and tracks the face in the tracking box, to guarantee a smooth rotation of the robot head.

Step S22: determining if the tracking box of the first image is located at a central area of the first image. As shown in FIG. 5, the first image has a width w and a height h, and a coordinate system OXY is established with the lower left corner of the first image being the origin. Assuming that the central area of the first image has a width of 0.1 w and a height of 0.1 h. The center of the central area coincides with the center of the first image. Thus, the coordinates of center A of the central area are (0.5 w, 0.5 h). The coordinates of the lower left corner, upper left corner, lower right corner, and upper right corner of the central area are (0.45 , 0.45 h), (0.45 w, 0.45 h), (0.55 w, 0.45 h), and (0.55 w, 0.55 h). Each pixel in the central area has a horizontal coordinate greater than 0.45 w and less than 0.55 w, and a vertical coordinates greater than 0.45 h and less than 0.55 h. In the embodiment, the coordinates of the center A of the central area are compared with the coordinates (x0, y0) of the center B of the tracking box of the first image, and the tracking box of the first image is determined to be located at a central area of the first image if the coordinates of the centers A and B are the same. In another embodiment, the tracking box of the first image is determined to be located at a central area of the first image if the coordinates of center B is located within the central area of the first image.

Step S23: if the tracking box of the first image is not located at a central area of the first image, controlling the robot head to rotate until a tracking box of a second image captured after the first image is located at a central area of the second image, thereby realizing that the robot head rotates as the tracked face moves. In the embodiment, the camera device of the robot is arranged in the robot head. The robot captures images with the camera device and can recognize one or more human faces in the captured images. The robot can select a face from the recognized faces to track. When the tracking box marking the tracked face in an image, such as the first image, is not located at a central area of the image, the robot will rotate its head from a first position to a second position. The robot head at the second position then captures an image (i.e., the second image) and determines if the tracking box in the second image is located at a central area of the second image using the steps S21 and S22. The robot stops rotating its head if the tracking box in the second image is located at a central area of the second image. It is noted that the "first" and the "second" herein are used to differentiate two images from each other and do not mean that the second image is necessarily successive to the first image.

Step S23 includes the following steps: computing a horizontal offset angle and a vertical offset angle of the center of the central area of the first image relative to the center of the tracking box of the first image, and controlling the robot head to horizontally rotate for the horizontal offset angle and to vertically rotate for the vertical offset angle, to cause a center of the central area of the second image to coincide with a center of the tracking box of the second image, to cause the center of the central area to coincide with the center of the tracking box.

As shown in FIG. 5, the horizontal angle is ∠ABD and the vertical angle is ∠ABC. The coordinates of the centers A and B are (0.5 w, 0.5 h) and (x0, y0), then BD=AC=a=|0.5 h−y0|, BC=AD=b=|0.5 w−x0|, and $$AB = c = \sqrt{a^2 + b^2}.$$

According to the Law of Cosines, $$\cos\angle ABD = \frac{BD}{AB} = \frac{a}{c},$$

and the horizontal angle $$\angle ABD = \arccos\frac{a}{c}.$$

Similarly, $$\cos\angle ABC = \frac{BC}{AB} = \frac{b}{c},$$

and the vertical angle $$\angle ABC = \arccos\frac{b}{c}.$$

After the robot head has horizontally rotated for the horizontal offset angle ∠ABD and vertically rotated for the vertical offset angle ∠ABC, the center of the central area of the second image coincides with the center of the tracking box of the second image, realizing that the robot head rotates as the tracked human face moves. The robot can thus show some kinds of lifelikeness.

In another embodiment, Step S23 may include the following steps: controlling the robot head to horizontally and vertically rotate to cause the center of the tracking box of the second image to be within the central area of the second area. Specifically, one or more images will be captured as the robot head rotates. The coordinates (x0, y0) of the center B of the tracking box of each of these images are read in real-time. If x0<0.45 w, the robot head is controlled to rotate left. If the x0>0.55 w, the robot head is controlled to rotate right. If y0<0.45 h, the robot head is controlled to rotate downward. If y0>0.45 h, the robot head is controlled to rotate upward. The robot head stops rotating when the tracked face is located at the center of one of these images. The above-mentioned steps need less computation and can realize a fast control.

The method of the present embodiment captures images using a built-in camera device, determines the tracking box of an image using face detection and tracking method, and controls a robot head to rotate until the tracking box of a captured image is located at a central area of the image. The method for controlling rotation of the robot head may control the robot head to rotate left/right and upward/downward based on the position of the tracking box and the central area of a captured image. A smooth rotation of the robot head can be realized by using the human face detecting and tracking method to determine the tracking box of a captured image.

Embodiment 3

Figure 6:
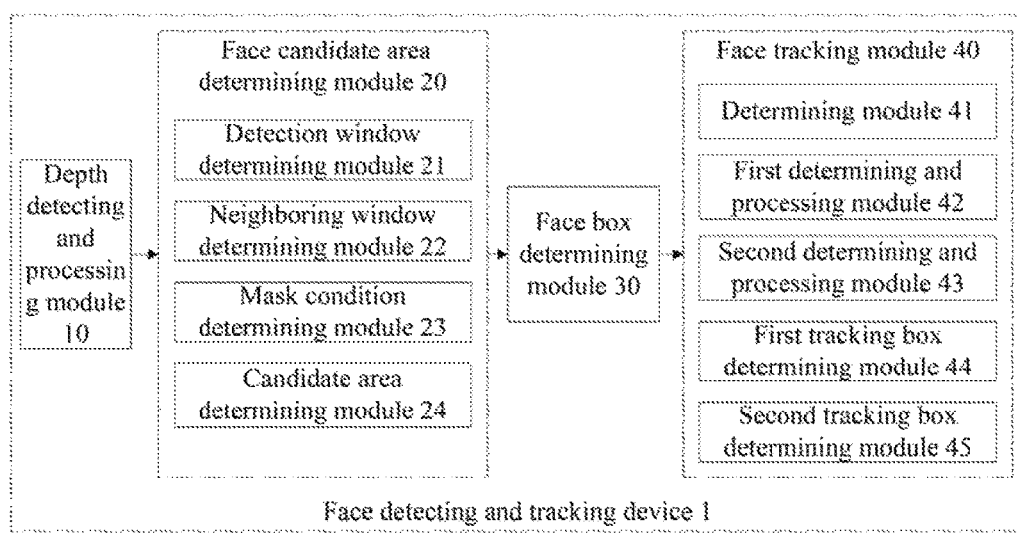
FIG. 6 is a block diagram of a face detecting and tracking device according to embodiment 3.
Figure 7:
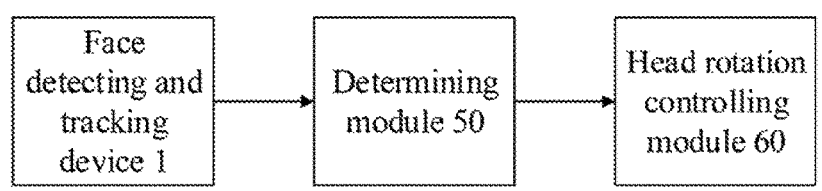
FIG. 7 is block diagram of a robot rotation control system according to embodiment 4.

FIG. 6 shows a block diagram of a face detecting and tracking device 1. The face detecting and tracking device 1 includes a depth detecting and processing module 10 that is used to acquire an image and perform a depth detection for the image to obtain a depth value of each pixel of the image. In the embodiment, each image includes I×J pixels, i.e., I rows and J columns of pixels. A pixel (i, j) refers to the pixel in column i, row j of the image, and the depth value of the pixel (i, j) is represented as d (i, j). One or more depth sensors are used to perform depth detection and process to the captured images to acquire the depth value d (i, j) of each pixel (i, j).

The face detecting and tracking device 1 also includes a face candidate area determining module 20 that is used to determine one or more face candidate areas based on depth value d (i, j) of each pixel (i, j) of the image of current frame. A face candidate area is an area that may include a human face. A human face detecting method is used to detect a human face in the face candidate area, which increases the human face detection accuracy. In the embodiment, the face candidate area determining module 20 includes a detection window determining module 21, a neighboring window determining module 22, a mask condition determining module 23 and a candidate area determining module 24.

The detection window determining module 21 is used to determine a detection window w1 corresponding to each pixel (i, j) of the image of current frame according to depth value (i, j) of each pixel of the image of current frame. Specifically, determining a face width s (i, j) corresponding to each pixel (i, j) of the image of current frame according to depth value (i, j) of each pixel (i, j) of the image of current frame. Then, creating a square detection box as the detection window w1 for each pixel (i, j) of the image of current frame. Each square detection box has a center located at a position of the pixel corresponding thereto, and a length equaling to the face width s (i, j) corresponding to the pixel that corresponds to the square detection box. The face width s (i, j) corresponding to each pixel (i, j) equals to the focal length f times an average face width $\bar{s}$, and divided by depth value (i, j) of the pixel, i.e., $$s(i, j) = \frac{f \times \bar{s}}{d(i, j)}.$$

The neighboring window determining module 22 is used to determine one or more neighboring windows neighboring each of the detection windows w1. The neighboring windows can include a left window w2 at the left side of the detection window w1, a right window w3 at the right side of the detection window w1, and an upper window w4 at the upper side of the detection window w1. Specifically, as shown in FIG. 3, determining a left window w2, a right window w3 and an upper window w4 that surround the detection window w1 at a left side, a right side and an upper side of the detection window w1. The detection window w1 and the left window w2, the right window w3 and the upper window w4 are spaced apart from each other by 1/N face width s (i, j), where N is a positive integer that is greater than 1.

In the embodiment, the value of N is set as 4 and the detection window w1 and the left window w2, the right window w3 and the upper window w4 are spaced apart from each other by ¼ face width s (i, j), and ¼ face width s (i, j) is thus the boundary between the face candidate area and the non-face candidate area. The left window w2 and the right window w3 are rectangles with a length of ⅝ face width s (i, j) and a width of ½ face width s (i, j). The lower sides of the left window w2 and the right window w3 are flush with the lower side of the detection window w1. The upper window w4 is a rectangle with a length of ⅝ face width s (i, j) and a width of ½ face width s (i, j). The left side of the upper window w4 is flush with the left side of the left window w2, and the right side of the upper window w4 is flush with the right side of the right window w3. In the embodiment, the length of all the sides of the detection window w1 and the neighboring windows (i.e., left window w2, right window w3 and upper window w4) are empirical values, and are related to a mask condition m (i, j) of the face candidate area.

The mask condition determining module 23 is used to determine if one of the detection windows w1 and the one or more neighboring windows corresponding thereto satisfy a mask condition m (i, j) of the one or more face candidate areas. The one or more neighboring windows may include a left window w2, a right window w3 and an upper window w4. The mask condition m (i, j) includes: an absolute difference between an average depth value $\mu_{w1}(i, j)$ of the one of the detection windows w1 and the depth value d (i, j) of the pixel corresponding to the one of the detection windows w1 is less than a first threshold τ1, and an absolute difference between each of average depth values of the one or more neighboring windows, including an average depth value $\mu_{w2}(i, j)$ of the left window w2, an average depth value $\mu_{w3}(i, j)$ of the right window w3, and an average depth value $\mu_{w4}(i, j)$ of the upper window w4, and the depth value d (i, j) of the pixel corresponding to the one of the detection windows is less than a second threshold τ2. That is, if $|\mu_{w1}(i, j)-d(i, j)|<\tau1$, $|\mu_{w2}(i, j)-d(i, j)|<\tau2$, $|\mu_{w3}(i, j)-d(i, j)|<\tau2$, and $|\mu_{w4}(i, j)-d(i, j)|<\tau2$, then the mask condition m (i, j) equals to 1 and the one of the detection windows w1 is one of the one or more face candidate areas. Otherwise, the mask condition m (i, j) equals to 0 and the one of the detection windows w1 is not one of the one or more face candidate areas. In the embodiment, the first threshold τ1 is less than the second threshold τ2. The first threshold τ1 is 100 mm and the second threshold τ2 is 200 mm.

In the embodiment, the average depth values $\mu_{w1}(i, j)$, $\mu_{w2}(i, j)$, $\mu_{w3}(i, j)$ and $\mu_{w4}(i, j)$ can be computed using the following formula:

$$\mu_{wk} = \frac{\sum_{(i,j) \in wk} v(i, j) \cdot d(i, j)}{\sum_{(i,j) \in wk} v(i, j) + \varepsilon},$$

where ε is a constant. The d (i, j) refers to the depth value of a pixel in one of the detection windows w1, the left window w2, the right window w3 or the upper window w4. The v (i, j) refers to effective depth measurement value of a pixel in one of the detection windows w1, the left window w2, the right window w3 or the upper window w4. The v (i, j) can be 0 or 1, and the ε is not equal to 0.

Specifically, the effective depth measurement value v (i, j) of a pixel is determined as follows. First, determining if the depth value d (i, j) of a pixel is greater than zero and less than a third threshold T. If so, the effective depth measurement value v (i, j) of a pixel is 1. Otherwise, the effective depth measurement value v (i, j) of a pixel is 0. The third threshold T equals to the focal length f of a depth sensor times an average face width $\bar{s}$, and divided by a minimum face width s*. If the depth value d (i, j) of a pixel is greater than the third threshold T, the size of the detection window s (i, j) of the pixel will be less than the minimum face width s*. The detection window s (i, j) will not be recognized when the face detecting is performed. In the embodiment, the minimum face width s* is 20 pixels, and the third threshold T is 4.5 m.

The mask condition determining module 23 is used to determine that the one of the detection windows w1 is one of the one or more face candidate areas, if the one of the detection windows w1 and the one or more neighboring windows corresponding thereto satisfy the mask condition m (i, j) of the one or more face candidate areas. The depth values d (i, j) of the pixels in a detection window w1 are close to one another. The depth values d (i, j) of each pixel in a detection window w1 and the depth values d (i, j) of each pixel in its neighboring windows w2, w3 and w4 have big difference. Thus, if a detection window w1 and its neighboring windows satisfy the mask condition m (i, j) of the one or more face candidate areas, the detection window w1 is considered to be one of the one or more face candidate areas.

The face detecting and tracking device 1 also includes a face box determining module 30 that is used to perform a face detection to the one or more face candidate areas to determine one or more face boxes of the image of current frame. In the embodiment, Viola-Jones face detection algorithm is used for face detection in the one or more face candidate areas. Viola-Jones face detection algorithm extract image feature values using integral images, which increase the face detection speed to some extent. Viola-Jones face detection algorithm also uses Adaboost classifier for feature screening, and preserves the most useful features, which lowers the computation complexity during the face detection and increase the face detection speed. In addition, Viola-Jones face detection algorithm has modified the Adaboost classifier into a cascade Adaboost classifier to increase the face detection accuracy. It can be understood that other algorithms may be used to perform the face detection except for Viola-Jones face detection algorithm.

The face detecting and tracking device 1 also includes a face box tracking module 40 that is used to determine a tracking box of the image of current frame based on the one or more face boxes and a tracked face box, and tracking the face in the tracking box of the image of current frame. The tracked face box herein is a face box tracked in the image of current frame using the face detecting and tracking method. The tracking box of the image of previous frame serving as the tracked face box of the image successive to the image of previous frame, can avoid that the face detection results of several successive images are inconsistent when one of the images does not include a human face. The face box tracking module 40 includes a determining module 41, a first determining and processing module 42, a second determining and processing module 43, a first tracking box determining module 44 and a second tracking box determining module 45.

The determining module 41 is used to determine if the image of current frame is a first frame of a plurality of images.

The first determining and processing module 42 is used to determine one of the one or more face boxes that has a maximum area to be the tracking box of the image of current frame, and track the face in the tracking box of the image of current frame, if the image of current frame is the first frame of the plurality of images. It can be understood that the tracked face box of the image of current frame is a face box of the image of current frame when the image of current frame is the first frame of the plurality of images. When there are plural face boxes, selecting the face box having the maximum area as the tracking box of the image of current frame and tracking the face in the tracking box of the image of current frame. The area of each face box equals to the product of the length and the width thereof.

The second determining and processing module 43 used to determine if one of the one or more face boxes that has a maximum area is greater than or equal to an area of the tracked face box of the image of current frame, if the image of current frame is not the first frame of the plurality of images. The area of tracked face box equals to the product of the length and the width thereof.

The first tracking box determining module 44 is used to determine the one of the one or more face boxes that has a maximum area to be the tracking box of the image of current frame, and track the face in the tracking box of the image of current frame, if the one of the one or more face boxes that has a maximum area is greater than or equal to an area of the tracked face box of the image of current frame.

The second tracking box determining module 45 is used to seek an intersection area of the tracked face box and the one or more face boxes of the image of current frame, determine at least a portion of the tracked face box within the intersection area to be the tracking box of the image of current frame, and track the face in the tracking box of the image of current frame, if the one of the one or more face boxes that has a maximum area is less than an area of the tracked face box of the image of current frame. If no intersection area exists, determining the face box of the image of current frame having the maximum area to be the tracking box of the image of current frame, and tracking the face in the tracking box of the image of current frame. In this situation, the original tracked face box is a missing face.

Specifically, compressive tracking algorithm is used to track the face in the tracking box of the image of current frame. The compressive tracking algorithm includes the following steps:

Acquiring a plurality of target images and background images from an image of previous frame, and performing a multi-scale transform for the plurality of target images and background images to obtain multi-scale image extraction features. Performing a dimension reduction to the multi-scale image extraction features to obtain dimension reduction features using sparse measurement matrix, and training a Naive Bayes classifier using the dimension reduction features for a screening of a target window of the image of current frame. The target images herein refer to the images acquired from inside the tracking box, and the target images are different from one another. The background images refer to the images acquired from outside the tracking box, and the background images are different from one another.

Scanning target images of a plurality of scanning windows around a target window of the image of current frame, and extracting multi-scale image extraction features of the target images, thereby avoiding scanning the whole of the image of current frame. Performing a dimension reduction to the multi-scale image extraction features to obtain dimension reduction features using the same sparse measurement matrix, and classifying the dimension reduction features using the trained Naive Bayes classifier and determining a window with the maximum classification score to be the target window of the image of next frame, thereby realizing the tracking from the image of current frame to the image of next frame. It can be understood that the steps of acquiring target images of a plurality of scanning windows from around a target window of the image of current frame, extracting multi-scale image extraction features, performing a dimension reduction to the multi-scale image extraction features, and training Naive Bayes classifier to classify, realize the tracking from the image of current frame to the image of next frame, which narrows the processing range of the face tracking algorithm and increases the processing speed.

The face detecting and tracking device 1 of the embodiment performs a depth detection and determines the depth value of each pixel of an image via the depth detecting and processing module 10. The device 1 determines one or more face candidate area according to the depth value of each pixel via the face candidate area determining module. The device 1 performs a face detection in the one or more face candidate areas to determine one or more face boxes of the image of current frame via the face box determining module 30, which reduces detection error and increases face detection accuracy. The device 1 then determines a tracking box of the image of current frame according to the one or more face boxes of the image of current frame and tracks the face in the tracking box via face box tracking module 40, to guarantee the continuity of face detection.

Embodiment 4

FIG. 4 shows a control system for controlling rotation of a robot. The robot includes a camera device for capturing images, and a depth sensor and a processor for detecting depth of the captured images. The control system includes a face detecting and tracking device, a determining module 50 and a head rotation controlling module 60.

The face detecting and tracking device is the face detecting and tracking device of embodiment 3, and is used for determining a tracking box of a first image, and a center of the tracking box. As shown in FIG. 5, the coordinates (x0, y0) of the center B of the tracking box of the first image are read its real-time. It can be understood when tracking a face using the face detecting and tracking device of the embodiment 3, it determines firstly one or more face candidate areas according to the depth value of each pixel, and then performs a face detection in the one or more face candidate areas, which reduces detection error and increase face detection accuracy. The face detecting and tracking device then determines a tracking box of the image according to the one or more face boxes of the image and tracks the face in the tracking box, to guarantee a smooth rotation of the robot head.

The determining module 50 determines if the tracking box of the first image is located at a central area of the first image. As shown in FIG. 5, the first image has a width w and a height h, and a coordinate system OXY is established with the lower left corner of the first image being the origin. Assuming that the central area of the first image has a width of 0.1 w and a height of 0.1 h. The center of the central area coincides with the center of the first image. Thus, the coordinates of center A of the central area are (0.5 w, 0.5 h). The coordinates of the lower left corner, upper left corner, lower right corner, and upper right corner of the central area are (0.45 w, 0.45 h), (0.45 w, 0.45 h), (0.55 w, 0.45 h), and (0.55 w, 0.55 h). Each pixel in the central area has a horizontal coordinate greater than 0.45 w and less than 0.55 w, and a vertical coordinate greater than 0.45 h and less than 0.55 h. In the embodiment, the coordinates of the center A of the central area are compared with the coordinates (x0, y0) of the center B the tracking box of the first image, and the tracking box of the first image is determined to be located at a central area of the first image if the coordinates of the centers A and B are the same. In another embodiment, the tracking box of the first image is determined to be located at a central area of the first image if the coordinates of center B is located within the central area of the first image.

The head rotation controlling module 60 is used to control the robot head to rotate until a tracking box of a second image captured after the first image is located at a central area of the second image if the tracking box of the first image is not located at a central area of the first image, thereby realizing that the robot head rotates as the tracked face moves. In the embodiment, the camera device of the robot is arranged in the robot head. The robot captures images with the camera device and can recognize one or more human faces in the captured images. The robot can select a face from the recognized faces to track. When the tracking box marking the tracked lace in an image, such as the first image, is not located at a central area of the image, the robot will rotate its head from a first position to a second position. The robot head at the second position then captures an image (i.e., the second image) and determines if the tracking box in the second image is located at a central area of the second image using the steps S21 and S22. The robot stops rotating its head if the tracking box in the second image is located at a central area of the second image. It is noted that the "first" and the "second" herein are used to differentiate two images from each other and do not mean that the second image is necessarily successive to the first image.

The head rotation controlling module 60 may compute a horizontal offset angle and a vertical offset angle of the center of the central area of the first image relative to the center of the tracking box of the first image, and control the robot head to horizontally rotate for the horizontal offset angle and to vertically rotate for the vertical offset angle, to cause a center of the central area of the second image to coincide with a center of the tracking box of the second image, to cause the center of the central area to coincide with the center of the tracking box.

As shown in FIG. 5, the horizontal angle is $\angle ABD$ and the vertical angle is $\angle ABC$. The coordinates of the centers A and B are (0.5 w, 0.5 h) and (x0, y0), then $BD=AC=a=|5.0 h-y0|$, $BC=AD=b=|5.0 w-x0|$, and $$AB = c = \sqrt{a^2 + b^2}.$$

According to the Law of Cosines, $$\cos\angle ABD = \frac{BD}{AB} = \frac{a}{c},$$

and the horizontal angle $$\angle ABD = \arccos\frac{a}{c}.$$

Similarly, $$\cos\angle ABC = \frac{BC}{AB} = \frac{b}{c},$$

and the vertical angle $$\angle ABC = \arccos\frac{b}{c}.$$

After the robot head his horizontally rotated for the horizontal offset angle $\angle ABD$ and vertically rotated for the vertical offset angle $\angle ABC$, the center of the central area of the second image coincides with the center of the tracking box of the second image, realizing that the robot head rotates as the tracked human face moves. The robot can thus show some kind of lifelikeness.

In another embodiment, the head rotation controlling module 60 may control the robot head to horizontally and vertically rotate to cause the center of the tracking box of the second image to be within the central area of the second area. Specifically, one or more images will be captured as the robot head rotates. The coordinates (x0, y0) of the center B of the tracking box of each of these images are read in real-time. If x0<0.45 w, the robot head is controlled to rotate left If the x0>0.55 w, the robot head is controlled to rotate right. If y0<0.45 h, the robot head is controlled to rotate downward. If y0>0.45 h, the robot head is controlled to rotate upward. The robot head stops rotating when the tracked face is located at the center of one of these images. The above-mentioned steps need less computation and can realize a fast control.

The control system of the present embodiment captures images using a built-in camera, determines the tracking box of an image using the face detection and tracking device of embodiment 3, and controls a robot head to rotate until the tracking box of a captured image is located at a central area of the image using the head rotation controlling module 60. The control system for controlling rotation of the robot head may control the robot head to rotate left/right and upward/downward based on the position of the tracking box and the central area of a captured image, which enables the robot to show some kind of lifelikeness during rotation. A smooth rotation of the robot head can be realized by using the human face detecting and tracking device to determine the tracking box of a captured image.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A face detecting and tracking method comprising:
    acquiring an image and performing a depth detection for the image to obtain a depth value of each pixel of the image;
    determining one or more face candidate areas with a center located at a position of the pixel corresponding thereto, based on depth value of each pixel of the image of current frame;
    performing a face detection to the one or more face candidate areas to determine one or more face boxes of the image of current frame; and
    determining a tracking box of the image of current frame based on the one or more face boxes and a tracked face box, and tracking the face in the tracking box of the image of current frame,
    wherein the step of determining one or more face candidate areas based on depth value of each pixel of the image of current frame, comprises:
    determining a detection window corresponding to each pixel of the image of current frame according to depth value of each pixel of the image of current frame;
    determining one or more neighboring windows neighboring each of the detection windows;
    determining if one of the detection windows and the one or more neighboring windows corresponding thereto satisfy a mask condition of the one or more face candidate areas; and
    if yes, the one of the detection windows is one of the one or more face candidate areas;
    wherein the step of determining a detection window corresponding to each pixel of the image of current frame according to depth value of each pixel of the image of current frame, comprises:
    determining a face width corresponding to each pixel of the image of current frame according to depth value of each pixel of the image of current frame; and
    creating a square detection box as the detection window for each pixel of the image of current frame, wherein each square detection box has a center located at a position of the pixel corresponding thereto, and a length equaling to the face width corresponding to the pixel that corresponds to the square detection box;
    wherein the step of determining one or more neighboring windows neighboring each of the detection windows, comprises:
    determining at least one of a left window, a right window and an upper window that surround each of the detection windows at a left side, a right side and an upper side of each of the detection windows, and each of the detection windows and the at least one of the left window, the right window and the upper window are spaced apart from each other by a first predetermined width;
    wherein the mask condition comprises: an absolute difference between an average depth value of the one of the detection windows and the depth value of the pixel corresponding to the one of the detection windows is less than a first threshold, and an absolute difference between average depth value of each of the one or more neighboring windows and the depth value of the pixel corresponding to the one of the detection windows is less than a second threshold, and the first threshold is less than the second threshold.

2. The method of claim 1, wherein the step of determining a tracking box of the image of current frame based on the one or more face boxes and a tracked face box, and tracking the face in the tracking box of the image of current frame, comprises:
    determining if the image of current frame is a first frame of a plurality of images;
    if the image of current frame is the first frame of the plurality of images, then determining one of the one or more face boxes that has a maximum area to be the tracking box of the image of current frame, and tracking the face in the tracking box of the image of current frame;
    if the image of current frame is not the first frame of the plurality of images, then determining if one of the one or more face boxes that has a maximum area is greater than or equal to an area of the tracked face box of the image of current frame;
    if yes, determining the one of the one or more face boxes that has a maximum area to be the tracking box of the image of current frame, and tracking the face in the tracking box of the image of current frame;
    if no, seeking an intersection area of the tracked face box and the one or more face boxes of the image of current frame, determining at least a portion of the tracked face box within the intersection area to be the tracking box of the image of current frame, and tracking the face in the tracking box of the image of current frame.

3. The method of claim 2, wherein the step of tracking the face in the tracking box of the image of current frame, comprises:
    acquiring a plurality of target images and background images from an image of previous frame, and performing a multi-scale transform for the plurality of target images and background images to obtain multi-scale image extraction features;

performing a dimension reduction to the multi-scale image extraction features to obtain dimension reduction features using sparse measurement matrix, and training a Naive Bayes classifier using the dimension reduction features;

scanning target images of a plurality of scanning windows around a target window of the image of current frame, and extracting multi-scale image extraction features of the target images; and performing a dimension reduction to the multi-scale image extraction features of the target images of the plurality of scanning windows to derive dimension reduction features using sparse measurement matrix, and classifying the derived dimension reduction features using the Naive Bayes classifier and determining a window with the maximum classification score to be the target window of the image of current frame.

4. A face detecting and tracking device comprising:

a depth detecting and processing module configured to acquire an image and perform a depth detection for the image to obtain a depth value of each pixel of the image;

a face candidate area determining module configured to determine one or more face candidate areas with a center located at a position of the pixel corresponding thereto based on depth value of each pixel of the image of current frame;

a face box determining module configured to perform a face detection to the one or more face candidate areas to determine one or more face boxes of the image of current frame; and a face box tracking module configured to determine a tracking box of the image of current frame based on the one or more face boxes and a tracked face box, and track the face in the tracking box of the image of current frame;

an acquiring module configured to acquire a plurality of target images and background images from an image of previous frame, and to perform a multi-scale transform for the plurality of target images and background images to obtain multi-scale image extraction features;

a first performing module configured to perform a dimension reduction to the multi-scale image extraction features to obtain dimension reduction features using sparse measurement matrix, and to train a Naive Bayes classifier using the dimension reduction features;

a scanning module configured to scan target images of a plurality of scanning windows around a target window of the image of current frame, and to extract multi-scale image extraction features of the target images; and a second performing module configured to perform a dimension reduction to the multi-scale image extraction features of the target images of the plurality of scanning windows to derive dimension reduction features using sparse measurement matrix, and to classify the derived dimension reduction features using the Naive Bayes classifier and determining a window with the maximum classification score to be the target window of the image of current frame.

5. The device of claim 4, wherein the face candidate area determining module comprises:

detection window determining module configured to determine a detection window corresponding to each pixel of the image of current frame according to depth value of each pixel of the image of current frame;

a neighboring window determining module configured to determine one or more neighboring windows neighboring each of the detection windows;

a mask condition determining module configured to determine if one of the detection windows and the one or more neighboring windows corresponding thereto satisfy a mask condition of the one or more face candidate areas; and a candidate area determining module configured to determine that the one of the detection windows is one of the one or more face candidate areas if the one of the detection windows and the one or more neighboring windows corresponding thereto satisfy the mask condition.

6. The device of claim 4, wherein the face box tracking module comprises:

a determining module configured to determine if the image of current frame is a first frame of a plurality of images;

a first determining and processing module configured to determine one of the one or more face boxes that has a maximum area to be the tracking box of the image of current frame, and track the face in the tracking box of the image of current frame, if the image of current frame is the first frame of the plurality of images;

a second determining and processing module configured to determine if one of the one or more face boxes that has a maximum area is greater than or equal to an area of the tracked face box of the image of current frame if the image of current frame is not the first frame of the plurality of images;

a first tracking box determining module configured to determine the one of the one or more face boxes that has a maximum area to be the tracking box of the image of current frame, and track the face in the tracking box of the image of current frame, if the one of the one or more face boxes that has a maximum area is greater than or equal to an area of the tracked face box of the image of current frame;

a second tracking box determining module configured to seek an intersection area of the tracked face box and the one or more face boxes of the image of current frame, determine at least a portion of the tracked face box within the intersection area to be the tracking box of the image of current frame, and track the face in the tracking box of the image of current frame, if the one of the one or more face boxes that has a maximum area is less than an area of the tracked face box of the image of current frame.

7. A face detecting and tracking method comprising:

acquiring an image and performing a depth detection for the image to obtain a depth value of each pixel of the image;

determining one or more face candidate areas with a center located at a position of the pixel corresponding thereto, based on depth value of each pixel of the image of current frame;

performing a face detection to the one or more face candidate areas to determine one or more face boxes of the image of current frame; and determining a tracking box of the image of current frame based on the one or more face boxes and a tracked face box, and tracking the face in the tracking box of the image of current frame, wherein the step of tracking the face in the tracking box of the image of current frame, comprises:

acquiring a plurality of target images and background images from an image of previous frame, and performing a multi-scale transform for the plurality of target images and background images to obtain multi-scale image extraction features;

performing a dimension reduction to the multi-scale image extraction features to obtain dimension reduction features using sparse measurement matrix, and training a Naive Bayes classifier using the dimension reduction features;

scanning target images of a plurality of scanning windows around a target window of the image of current frame, and extracting multi-scale image extraction features of the target images; and performing a dimension reduction to the multi-scale image extraction features of the target images of the plurality of scanning windows to derive dimension reduction features using sparse measurement matrix, and classifying the derived dimension reduction features using the Naive Bayes classifier and determining a window with the maximum classification score to be the target window of the image of current frame.

8. The method of claim 7, wherein the step of determining one or more face candidate areas based on depth value of each pixel of the image of current frame, comprises:

determining a detection window corresponding to each pixel of the image of current frame according to depth value of each pixel of the image of current frame;

determining one or more neighboring windows neighboring each of the detection windows;

determining if one of the detection windows and the one or more neighboring windows corresponding thereto satisfy a mask condition of the one or more face candidate areas; and if yes, the one of the detection windows is one of the one or more face candidate areas.

9. The method of claim 8, wherein the step of determining a detection window corresponding to each pixel of the image of current frame according to depth value of each pixel of the image of current frame, comprises: determining a face width corresponding to each pixel of the image of current frame according to depth value of each pixel of the image of current frame; and creating a square detection box as the detection window for each pixel of the image of current frame, wherein each square detection box has a center located at a position of the pixel corresponding thereto, and a length equaling to the face width corresponding to the pixel that corresponds to the square detection box.

10. The method of claim 9, wherein the step of determining one or more neighboring windows neighboring each of the detection windows comprises:

determining at least one of a left window, a right window and an upper window that surround each of the detection windows at a left side, a right side and an upper side of each of the detection windows, and each of the detection windows and the at least one of the left window, the right window and the upper window are spaced apart from each other by a first predetermined width.

11. The method of claim 10, wherein the mask condition comprises: an absolute difference between an average depth value of the one of the detection windows and the depth value of the pixel corresponding to the one of the detection windows is less than a first threshold, and an absolute difference between average depth value of each of the one or more neighboring windows and the depth value of the pixel corresponding to the one of the detection windows is less than a second threshold, and the first threshold is less than the second threshold.

* * * * *